United States Patent
Hiji et al.

(10) Patent No.: US 8,760,388 B2
(45) Date of Patent: Jun. 24, 2014

(54) DISPLAY MEDIUM, METHOD OF PRODUCING DISPLAY MEDIUM, AND DISPLAY DEVICE

(75) Inventors: Naoki Hiji, Kanagawa (JP); Akihide Kawamura, Kanagawa (JP); Yasufumi Suwabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 596 days.

(21) Appl. No.: 13/021,112

(22) Filed: Feb. 4, 2011

(65) Prior Publication Data

US 2012/0044228 A1 Feb. 23, 2012

(30) Foreign Application Priority Data

Aug. 17, 2010 (JP) ................................. 2010-182376

(51) Int. Cl.
*G09G 5/00* (2006.01)

(52) U.S. Cl.
USPC ......................................................... 345/107

(58) Field of Classification Search
USPC ............... 345/107; 359/296; 349/86; 445/24; 156/292
See application file for complete search history.

(56) References Cited

U.S. PATENT DOCUMENTS

| | | | | |
|---|---|---|---|---|
| 6,700,695 | B2 * | 3/2004 | Engler et al. ................... | 359/296 |
| 7,733,325 | B2 * | 6/2010 | Hamaguchi .................... | 345/107 |
| 7,952,791 | B2 * | 5/2011 | Yanagisawa et al. .......... | 359/296 |
| 8,106,853 | B2 * | 1/2012 | Moore et al. ...................... | 345/5 |
| 2004/0085619 | A1 | 5/2004 | Wu et al. | |
| 2005/0007648 | A1 | 1/2005 | Wu et al. | |
| 2005/0133154 | A1 | 6/2005 | Daniel et al. | |
| 2006/0255322 | A1 | 11/2006 | Wu et al. | |
| 2007/0152196 | A1 | 7/2007 | Wu et al. | |
| 2007/0286986 | A1 | 12/2007 | Daniel et al. | |
| 2008/0020007 | A1 | 1/2008 | Zang | |
| 2010/0301280 | A1 | 12/2010 | Wu et al. | |
| 2011/0075249 | A1 | 3/2011 | Murakami | |
| 2012/0176663 | A1 | 7/2012 | Zang et al. | |

FOREIGN PATENT DOCUMENTS

| | | |
|---|---|---|
| JP | A-2000-19531 | 1/2000 |
| JP | A-2003-270674 | 9/2003 |
| JP | A-2004-138959 | 5/2004 |
| JP | A-2004-138960 | 5/2004 |
| JP | A-2004-287188 | 10/2004 |
| JP | A-2004-317830 | 11/2004 |

(Continued)

OTHER PUBLICATIONS

Dec. 17, 2013 Office Action in Japanese Application No. 2010-182376 (with English Translation).

(Continued)

*Primary Examiner* — Abbas Abdulselam
(74) *Attorney, Agent, or Firm* — Oliff PLC

(57) ABSTRACT

A display medium includes: a pair of substrates; a spacing member that maintain a gap between the pair of substrates and has a first portion projecting in an intersecting direction, the intersecting direction intersecting a direction in which the pair of substrates face each other; and a holding layer that is provided on at least one of the pair of substrates such that the holding layer fills a space between the at least one of the pair of substrates and an end face of the spacing member, the holding layer covers the first portion from the end face of the spacing member, and the holding layer holds an end part of the spacing member in the direction in which the pair of substrates face each other.

10 Claims, 15 Drawing Sheets

(56) References Cited

FOREIGN PATENT DOCUMENTS

| | | |
|---|---|---|
| JP | A-2005-164967 | 6/2005 |
| JP | A-2005-182043 | 7/2005 |
| JP | A-2005-533289 | 11/2005 |
| JP | A-2005-352316 | 12/2005 |
| JP | A-2006-58544 | 3/2006 |
| JP | A-2006-162900 | 6/2006 |
| JP | A-2006-259456 | 9/2006 |
| JP | A-2008-107484 | 5/2008 |
| JP | A-2008-224765 | 9/2008 |
| JP | A-2009-294275 | 12/2009 |
| JP | A-2009-544060 | 12/2009 |
| JP | A-2011-170019 | 9/2011 |

OTHER PUBLICATIONS

Mar. 4, 2014 Office Action issued in Japanese Application No. 2010-182376 (with English Translation).

\* cited by examiner

FIG.16A
FIG.16B
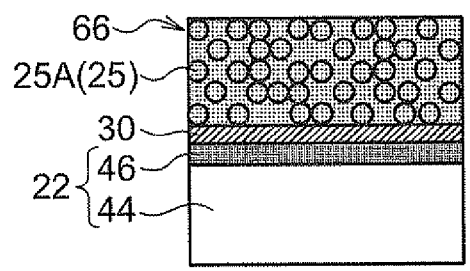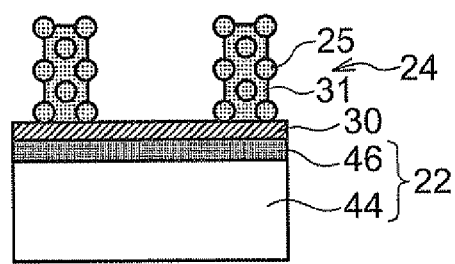
FIG.17A
FIG.17B
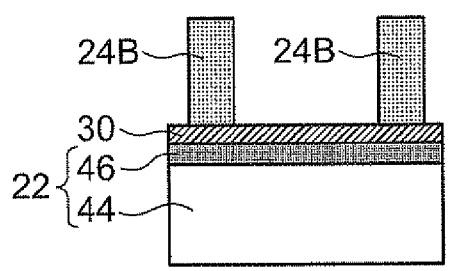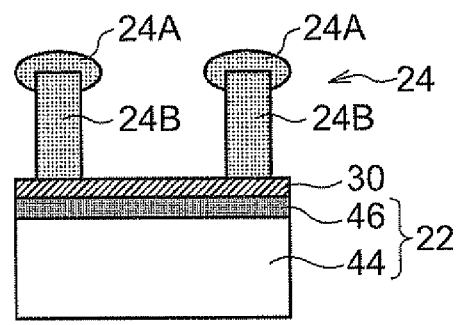

DISPLAY MEDIUM, METHOD OF PRODUCING DISPLAY MEDIUM, AND DISPLAY DEVICE

CROSS-REFERENCE TO RELATED APPLICATION

This application is based on and claims priority under 35 USC 119 from Japanese Patent Application No. 2010-182376, filed on Aug. 17, 2010.

BACKGROUND

1. Technical Field

The present invention relates to a display medium, a method of producing a display medium, and a display device.

2. Related Art

It is proposed, as a partition wall that constantly maintains a gap between a display substrate and a rear substrate in a display medium, a partition wall having a configuration in which a contact area between the partition wall and the display substrate is larger than a contact area between the partition wall and the rear substrate.

It is proposed that a layer formed of microcapsules enclosing an adhesive agent is provided on one substrate (second substrate) of a pair of substrates, and the other substrate (first substrate) has a plate-like wall structure extending from the first substrate toward the second substrate.

SUMMARY

According to an aspect of the invention, there is provided a display medium including:

a pair of substrates;

a spacing member that maintain a gap between the pair of substrates and has a first portion projecting in an intersecting direction, the intersecting direction intersecting a direction in which the pair of substrates face each other; and a holding layer that is provided on at least one of the pair of substrates such that the holding layer fills a space between the at least one of the pair of substrates and an end face of the spacing member, the holding layer covers the first portion from the end face of the spacing member, and the holding layer holds an end part of the spacing member in the direction in which the pair of substrates face each other.

BRIEF DESCRIPTION OF THE DRAWINGS

Exemplary embodiment(s) of the present invention will be described in detail based on the following figures, wherein:

FIGS. 16A and 16B are pattern diagrams illustrating a process of manufacturing the display medium according to the present exemplary embodiment;

FIGS. 17A and 17B are pattern diagrams illustrating a process of manufacturing the display medium according to the present exemplary embodiment;

DETAILED DESCRIPTION

One exemplary embodiment of the present invention is described below with reference to drawings. Members whose operation and function take the same action are given the same symbol in all drawings and duplicating explanation may be omitted.

Figure 1:
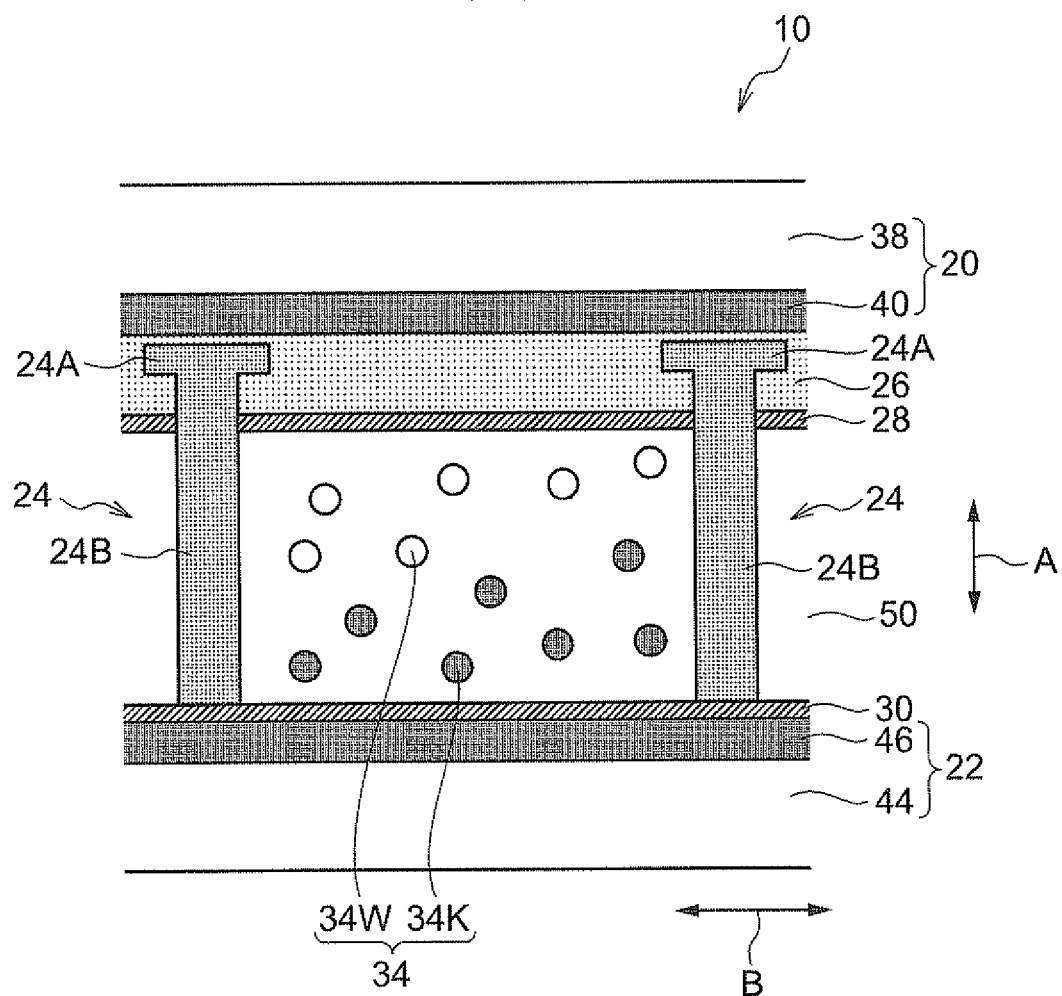
FIG. 1 is a schematic constitutional diagram illustrating an example of a display medium according to the present exemplary embodiment.
Figure 2:
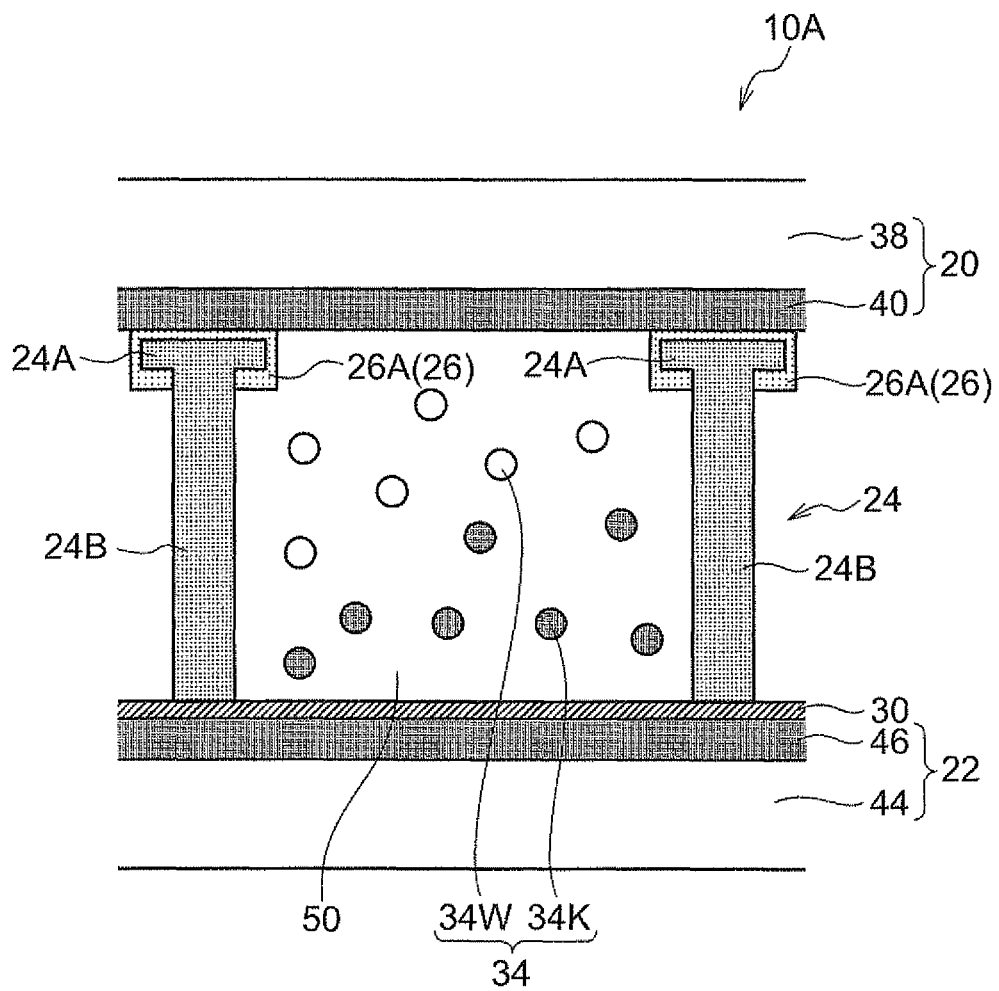
FIG. 2 is a schematic constitutional diagram illustrating an example of a display medium according to the present exemplary embodiment.

FIG. 1 and FIG. 2 are schematic constitutional diagrams of a display device according to the present exemplary embodiment.

Figure 3A:
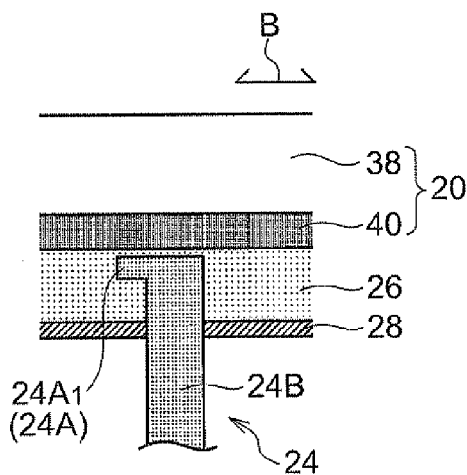
FIGS. 3A and 3B are pattern diagrams illustrating an example of a sectional shape of a spacing member in the display medium according to the present exemplary embodiment taken along a direction in which a pair of substrates face each other.
Figure 3B:
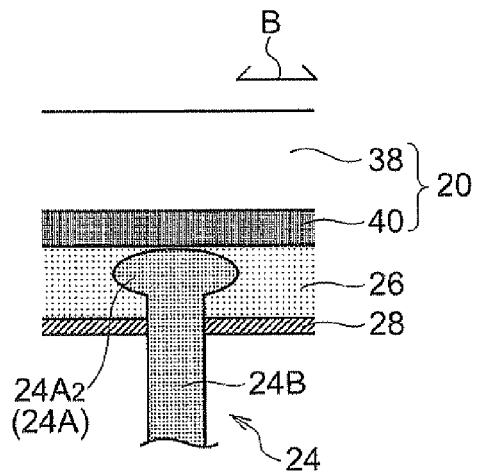
Figure 4A:
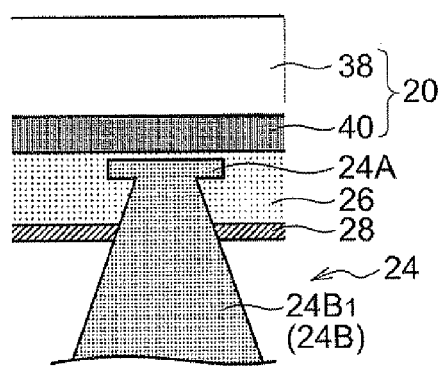
FIGS. 4A and 4B are pattern diagrams illustrating an example of a sectional shape of the spacing member in the display medium according to the present exemplary embodiment taken along a direction in which a pair of substrates face each other.
Figure 4B:
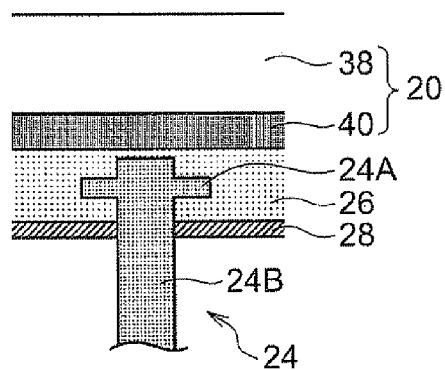
Figure 5A:
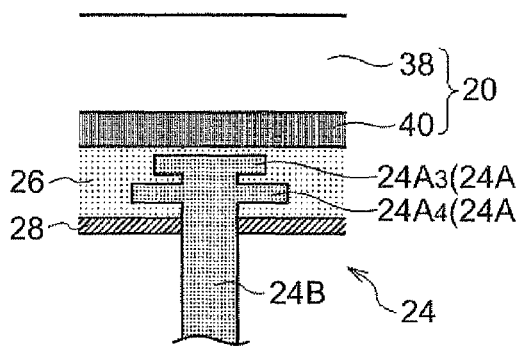
FIGS. 5A and 5B are pattern diagrams illustrating an example of a sectional shape of the spacing member in the display medium according to the present exemplary embodiment taken along a direction in which a pair of substrates face each other.
Figure 5B:
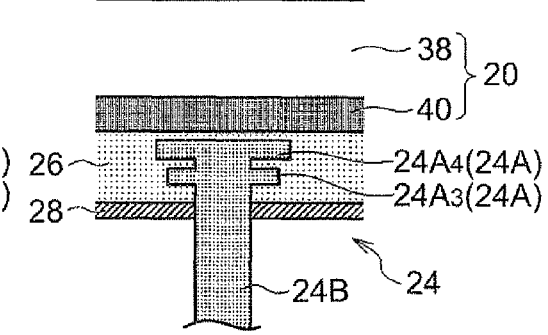
Figure 6A:
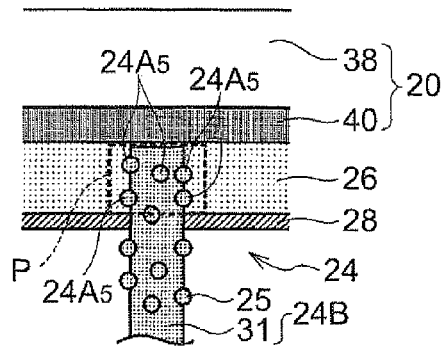
FIGS. 6A and 6B are pattern diagrams illustrating an example of a sectional shape of the spacing member in the display medium according to the present exemplary embodiment taken along a direction in which a pair of substrates face each other.
Figure 6B:
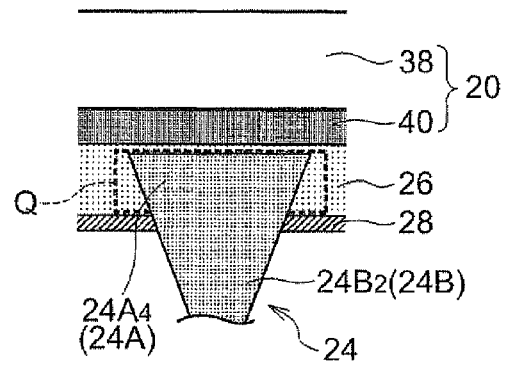
Figure 7:
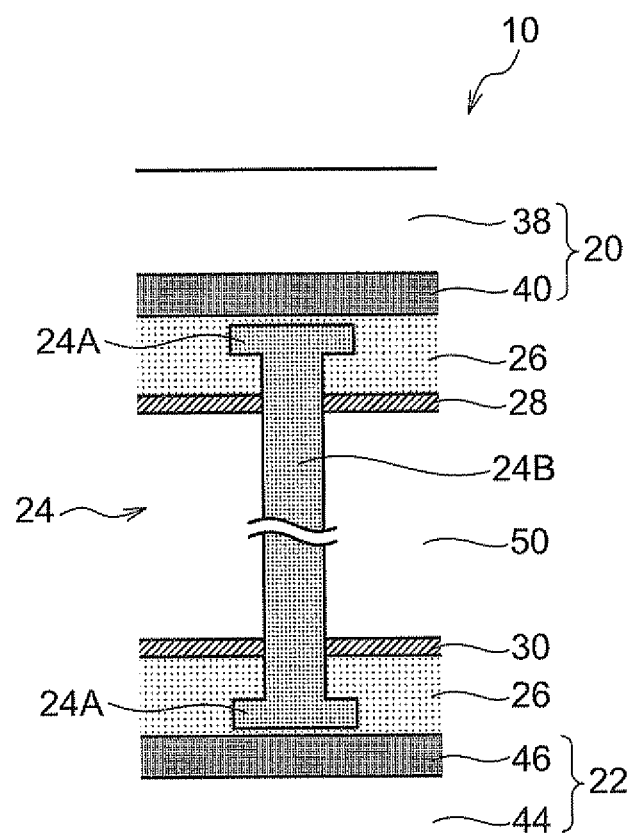
FIG. 7 is a pattern diagram illustrating an example of a sectional shape of the spacing member in the display medium according to the present exemplary embodiment taken along a direction in which a pair of substrates face each other.

FIGS. 3A and 3B are pattern diagrams illustrating an example of a sectional shape of a spacing member in the display medium according to the present exemplary embodiment taken along a direction in which a pair of substrates face each other. FIGS. 4A and 4B are pattern diagrams illustrating an example of a sectional shape of the spacing member in the display medium according to the present exemplary embodiment taken along a direction in which a pair of substrates face each other. FIGS. 5A and 5B are pattern diagrams illustrating an example of a sectional shape of the spacing member in the display medium according to the present exemplary embodiment taken along a direction in which a pair of substrates face each other. FIGS. 6A and 6B are pattern diagrams illustrating an example of a sectional shape of the spacing member in the display medium according to the present exemplary embodiment taken along a direction in which a pair of substrates face each other. FIG. 7 is a pattern diagram illustrating an example of a sectional shape of the spacing member in the display medium according to the present exemplary embodiment taken along a direction in which a pair of substrates face each other.

As illustrated in FIG. 1, a display medium 10 according to the present exemplary embodiment includes a display substrate 20 that is to be served as an image displaying surface, a rear substrate 22 provided on the display substrate 20 with a gap therebetween, a spacing member 24 that maintains the gap between the display substrate 20 and the rear substrate 22 such that the gap has a predetermined distance, a dispersing medium 50 that is filled into a space between the display substrate 20 and the rear substrate 22, and particles 34 dispersed in the dispersing medium 50.

A holding layer 26 is provided on a surface of the display substrate 20 at a side at which the display substrate 20 faces the rear substrate 22, and the holding layer 26 maintains one end part of the spacing member 24 at a side of the display substrate 20 (details are described below). On the holding layer 26 (at a side at which the holding layer 26 faces the rear substrate 22) is provided a surface layer 28 for suppressing adhesion of particles 34 which is filled into the space between the display substrate 20 and the rear substrate 22. On a surface of the rear substrate 22 at a side at which the rear substrate 22 faces the display substrate 20 is provided a surface layer 30.

The display medium 10 corresponds to the display medium of the invention, and the display substrate 20 and the rear substrate 22 correspond to the pair of substrates in the display medium of the invention. The spacing member 24 corresponds to the spacing member in the display medium of the invention, and a first portion 24A described below corresponds to the first portion in the display medium of the invention. The holding layer 26 corresponds to the holding layer in the display medium of the invention.

Although adhesion strength enough for withstanding flexure is required between the components forming the display medium 10, particularly the adhesion strength between the spacing member 24 and the display substrate 20 is insufficient in conventional display media in some cases.

Thus, in the display medium 10 according to the present exemplary embodiment, the spacing member 24 has a configuration in which the first portion 24A projecting in an intersecting direction is provided at an end of the spacing member 24 in a facing direction of the substrates that face each other. And, on a surface of the display substrate 20 at a side at which the display substrate 20 faces the rear substrate 22 is provided the holding layer 26 that maintains the end part of the spacing member 24 on a side of the display substrate 20. The holding layer 26 is filled into a gap between a surface of the display substrate 20 at a side which the display substrate 20 faces the rear substrate 22 and an end face of the spacing member 24 at a side which the spacing member 24 faces the display substrate 20, and the holding layer 26 is provided so as to continuously cover the first portion 24A from an end surface of the spacing member 24 which faces the display substrate 20.

For this reason, the end part of the spacing member 24 at a side at which the display substrate 20 is provided is held on the side at a side at which the display substrate 20 is provided such that the first portion 24A provided at the end part is embedded in the holding layer 26 provided on the display substrate 20.

According to the present exemplary embodiment, the above expression "facing direction of the substrates" represents a direction in the spacing member 24 which the display substrate 20 and the rear substrate 22 face each other (see the direction of an arrow A in FIG. 1). According to the present exemplary embodiment, the above expression "intersecting direction" represents the direction that intersects the above facing direction of the substrates (see the direction of an arrow B in FIG. 1).

The above expression "end part", which is a region provided at the first portion 24A in the spacing member 24 represents a region covered with the holding layer 26 (in other words, embedded in the holding layer 26), in the entire region of the spacing member 24 extending from one end surface to the other end surface in the facing direction of the substrates.

Thus, the above expression "first portion 24A" represents a portion projecting in the intersecting direction (the direction of arrow B in FIG. 1) in the region covered with the holding layer 26 in the spacing member 24 (see FIG. 1). Specifically, as shown in FIG. 1, when the spacing member 24 has a shape such that the shape cross-sectioned in the facing direction of the substrates is a letter T shape, the first portion 24A in the spacing member 24 having a cross section of the letter T shape is a portion which has a cross-sectional area in the intersecting direction larger than a region joined to a side of the rear substrate 22, within the holding layer 26.

The first portion 24A, which is a portion "projecting in the intersecting direction", is further specifically a portion that has a cross-sectional area perpendicular to the facing direction of the substrates (the direction of the arrow B in FIG. 1) being larger than the cross-sectional area of another portion joined to the side of the substrate (the rear substrate 22 according to the present exemplary embodiment) which faces to the substrate at a side at which the end part with the first portion 24A is provided (the display substrate 20 according to the present exemplary embodiment), and that is covered with the holding layer 26 in the entire region of the spacing member 24 extending from one end surface to the other end surface in the facing direction of the substrates.

As described above, the display medium 10 according to the present exemplary embodiment has a configuration in which the spacing member 24 has the first portion 24A. On a surface of the display substrate 20 at a side at which the display substrate 20 faces the rear substrate 22 is provided the holding layer 26 that maintains one end part of the spacing member 24 at a side of the display substrate 20, and the holding layer 26 is filled into a gap between a surface of the display substrate 20 at a side which the display substrate 20 faces the rear substrate 22 and an end surface of the spacing member 24 at a side at which the spacing member 24 faces the display substrate 20, and the folding layer 26 is provided so as to continuously cover the first portion 24A from an end surface of the spacing member 24 which faces the display substrate 20.

Therefore, it is thought that the first portion 24A is held in a state such that the first portion 24A is embedded in the holding layer 26 provided on the display substrate 20, so that the adhesive force between the spacing member 24 and the display substrate 20 may be improved.

In FIG. 1 is illustrated, as an example, a case where the shape of the spacing member 24 is a shape such that the shape cross-sectioned in the facing direction of the substrates is a letter T shape, and the first portion 24A in the spacing member 24 having a cross section with a letter T shape, is a portion which has a cross-sectional area in the intersecting direction larger than a region joined to the side of the rear substrate 22 within the holding layer 26. However, the shape of the spacing member 24 may be any shape having the first portion 24A and it is not restricted to such a shape having a cross section with a letter T shape. Specific examples of the spacing member 24 having a shape other than a letter T shape in cross-section are described in detail below.

The spacing member 24 maintains the gap between the substrates, i.e., the display substrate 20 and the rear substrate 22 and may have a function as a partition member to divide the gap between the substrates, i.e., the display substrate 20 and the rear substrate 22, in two or more cells. Cells are regions each surrounded by the display substrate 20, the rear substrate 22, and the spacing member 24. A dispersing medium 50 in which particles 34 are dispersed is filled in each of the cells. The particles 34 includes multiple particles (for example, white particles 34W and black particles 34K) and move within the gap between the substrates, i.e., the display substrate 20 and the rear substrate 22, depending on the strength of the electric field formed in a cell.

By providing the spacing member 24 so as to correspond to each pixel when an image is displayed on the display medium 10 and to form cells so that they correspond to each pixel, for example, a display of one pixel per cell is produced in the display medium 10. A cell may be provided corresponding to two or more pixels, namely, a display of two or more pixels per one cell may be produced.

In order to simplify explanation, the present exemplary embodiment is explained with a drawing in which one cell is focused. In the following, the configuration of each member is explained in detail.

The display substrate 20 has a configuration in which an electrode 40 is superposed on a supporting substrate 38. The rear substrate 22 has a configuration in which an electrode 46 is superposed on a supporting substrate 44.

The display substrate 20 has, or both the display substrate 20 and the rear substrate 22 have translucency.

Herein, the translucency according to the present exemplary embodiment indicates that the transmittance of visible light is 60% or more.

Examples of the supporting substrate 38 and the supporting substrate 44 include glass and plastics such as a polyethylene terephthalate resin, a polyethylene naphthalate resin, a polycarbonate resin, an acrylic resin, a polyimide resin, a polyester resin, an epoxy resin, a polyether sulfone resin, or a polyolefin resin. Of the supporting substrate 38 and the supporting substrate 44, a supporting substrate located at a side opposite of an observation surface may be opaque. In this case, a bakelite resin, a paper-epoxy resin, a ceramic plate, a stainless steel plate with insulating coating, a silicon wafer and the like may be used as the material forming the supporting substrate.

Examples of a material used for the electrode 40 and the electrode 46 include an oxide of indium, tin, cadmium, or antimony, a complex oxide such as ITO, a metal such as gold, silver, copper, or nickel, and an organic material such as polypyrrole and polythiophene. These may be used to form an electrode with a single layer film, a mixed film, or a composite film by a vacuum deposition, a sputtering method, an application method, and the like. Each of the electrode 46 and the electrode 40 is formed to have a desired pattern, for example, a matrix form or a straight line form (a lattice form), by a conventional known method such as etching and the like of a display medium or a printed circuit board.

The electrode 40 may also be embedded in the supporting substrate 38. The electrode 46 may also be embedded in the supporting substrate 44. The electrode 46 may be separate from the rear substrate 22 and the electrode 40 may be separate from the display substrate 20 such that each of the electrode 46 and the electrode 40 is disposed outside the display medium 10.

Although a case where the electrodes (electrode 40 and electrode 46) are provided on the display substrate 20 and the rear substrate 22, respectively, is explained in the above, one of the electrodes may be provided on only one of the substrates, that is, undergoing active matrix driving may be acceptable.

In order to realize active matrix driving, each of the supporting substrate 38 and the supporting substrate 44 may have a TFT (thin-film transistor) per every pixel. It is favorable that the TFT be formed not on the display substrate 20 but on the rear substrate 22 because it is easy to form a lamination of wiring and component mounting.

The dispersing medium 50 is a liquid that is filled between the substrates, i.e., the display substrate 20 and the rear substrate 22, in the display medium 10. The dispersing medium 50 is preferably an electrically insulative liquid. Here, the expression "electrically insulative" indicates that the volume resistivity is $10^{11}$ Ωcm or more. This is also applied hereinafter.

Specific examples of the electrically insulative liquid include hexane, cyclohexane, toluene, xylene, decane, hexadecane, kerosene, paraffin, isoparaffin, silicone oil, dichloroethylene, trichloroethylene, perchloroethylene, high-purity petroleum, ethylene glycol, alcohols, ethers, esters, dimethylformamide, dimethylacetamide, dimethyl sulfoxide, N-methyl pyrrolidone, 2-pyrrolidone, N-methylformamide, acetonitrile, tetrahydrofuran, propylene carbonate, ethylene carbonate, benzine, diisopropylnaphthalene, olive oil, isopropanol, trichlorotrifluoroethane, tetrachloroethane, and dibromotetrafluoroethane, and the mixtures thereof.

Water (i.e., pure water) is also used suitably as the dispersing medium 50 by removing impurities so that the following volume resistance value may be achieved. The volume resistance value is preferably $10^3$ Ωcm or more, more preferably from $10^7$ Ωcm to $10^{19}$ Ωcm, and particularly preferably from $10^{10}$ Ωcm to $10^{19}$ Ωcm. It is thought that by achieving a volume resistance value within this range, an electric field is applied to the particles 34 more effectively and the generation of bubbles due to the electrolysis of a liquid caused by an electrode reaction is suppressed, whereby deterioration of the electrophoretic property of the particles 34 at every application of electric current is suppressed.

Although a case where the dispersing medium 50 is filled into each cell of the display medium 10 is explained according to the present exemplary embodiment, air may fill each cell, and there is no restriction to the embodiment in which a liquid is filled into each of the cells.

The particles 34 are filled in a cell. According to the present exemplary embodiment, the particles 34 are dispersed in the dispersing medium 50. Examples of the particles 34 include particles that moves depending on the electric field formed (i.e., electrophoretic migration). The particles 34 may be any particles that move depending on the electric field applied, and examples thereof include glass beads, particles of an electrically insulative metal oxide, such as alumina or titanium oxide, particles of thermoplastic or thermosetting resins, resin particles with a colorant fixed on the surface thereof, particles containing a colorant in a thermoplastic or thermosetting resin, and metal colloid particles having a plasmon coloring function.

According to the present exemplary embodiment, the holding layer 26 is filled in a gap between the surface of the display substrate 20 at a side at which the display substrate 20 faces the rear substrate 22 and the end surface of the spacing member 24 at a side at which the spacing member 24 faces the display substrate 20, and the holding layer 26 is provided so as to continuously cover the first portion 24A from the end surface of the spacing member 24 facing the display substrate 20. The holding layer 26 is a layer that has the function of maintaining an end part of the spacing member 24 as described above, and the holding layer 26 is provided so as to continuously covers the first portion 24A from the end surface of the spacing member 24, whereby it is disposed so that the first portion 24A provided at the end part of the spacing member 24 may be embedded in the holding layer 26.

The holding layer 26 may, as described above, is filled a gap between the surface of the display substrate 20 at a side at which the display substrate 20 face the rear substrate 22 and an end surface of the spacing member 24 at a side at which the spacing member 24 faces the display substrate 20 and is provided so as to continuously cover the first portion 24A from an end surface of the spacing member 24 which faces the display substrate 20.

For example, the holding layer 26 may have a configuration that the holding layer 26 is formed in a layer form in the entire region of the surface facing the rear substrate 22 of the display substrate 20, as illustrated in FIG. 1. The holding layer 26 is not restricted to the configuration that the holding layer 26 is formed in a layer form in the entire region of the surface facing the rear substrate 22 of the display substrate 20, and the holding layer 26 may be, for example, in a configuration that the holding layer 26 is formed in a region facing the end surface of the spacing member 24 in the entire region of the surface of the display substrate 20 facing the rear substrate 22 and is formed such that the holding layer 26 is joined to the region to the end surface of the spacing member 24 and to a region covering the first portion 24A from the end surface as in the display medium 10A illustrated in FIG. 2.

The holding layer 26 may have the function of maintaining the end part of the spacing member 24 on the side of the display substrate 20 as mentioned above, and it may be electrically conductive (having a volume resistivity of $10^4$ Ωcm or less) or may be electrically insulative (having a volume resistivity of $10^{11}$ Ωcm or more).

When the holding layer 26 is provided in a layer form in the entire region of the surface of the display substrate 20 facing the rear substrate 22 and the holding layer 26 formed in the layer form is an electrically conductive layer, the holding layer 26 is to function as an electrode (so-called solid electrode). Therefore, in this case it is unnecessary to provide an electrode (the electrode 40 in FIG. 1) on the display substrate 20, whereby it is thought that the display medium 10 may be expected to have a reduced in thickness.

When there is a configuration that the electrode 40 is provided on the side of the displayer substrate 20, and the holding layer 26 is provided in a layer form in the entire region of the surface of the display substrate 20 facing the rear substrate 22, it is preferable that the holding layer 26 be made electrically insulative.

When two or more holding layers 26 (holding layers 26A) are provided at intervals on the surface of the display substrate 20 facing the rear substrate 22 as illustrated in FIG. 2, it is preferable that the holding layer 26 be made electrically insulative.

As to material forming the holding layer 26, the holding layer 26 may use a material that satisfies characteristics for maintaining the end part of the spacing member 24 when being formed as the holding layer 26.

Examples of the material forming the holding layer 26 include curable materials that cure through the application of a stimulus, such as heat and light, two-liquid curable materials that cure through chemical reactions between two compounds, moisture-absorption-curable materials that are cured by humidity, and thermoplastic materials that has necessary hardness at room temperature and are softened when being heated.

Examples of the curable materials include photocurable resins, thermosetting resins, and electron beam-curable resins.

Examples of the photocurable resins include epoxy resins, acrylic resins, urethane acrylic resins, and polyene-thiol resins.

Examples of the thermosetting resins include epoxy resins, polyester resins, phenol resins, melamine resins, urea resins, and alkyd resins.

Examples of the electron beam-curable resins include acrylic resins, methacrylic resins, urethane resins, polyester resins, polyether resins, and silicone resins.

Examples of the two-liquid curable materials include epoxy resins, urethane resins, and silicone resins. Examples of the moisture-absorption-curable resins include cyanoacrylate resins and modified silicone resins. Examples of the thermoplastic resins include polyester resins, urethane resins, ethylene-vinyl acetate resins, styrene-butadiene rubber-based resins, nitrile rubber-based resins, polyimide resins, and polyolefin resins.

Among these, photocurable adhesives are preferably used as the material forming the holding layer 26, from the viewpoint that the time period for which photocurable adhesives contact with a dispersing medium 50 in their uncured state may be short.

When the holding layer 26 is an electrically conductive layer, the material forming the holding layer 26 may be imparted electrical conductivity by adding a known electrically conductive agent to a material provided above.

When the holding layer 26 is an electrically insulative layer, electrically insulative materials, such as the epoxy resins, acrylic resins, urethane resins, and silicone resins among the specific examples listed above may be used as the material forming the holding layer 26.

Although the thickness of the holding layer 26 may be such a thickness that the first portion 24A provided at the end part of the spacing member 24 is covered, it is specifically within the range of from 1 μM to 20 μm or the range of from 5 μm to 10 μm.

The expression "thickness of the holding layer 26" referred to herein indicates the maximum thickness of the holding layer 26.

A surface layer 28 and a surface layer 30 are provided for suppression of adhering of the particles 34 to the side of the display substrate 20 or to the side of the rear substrate 22.

A material forming the surface layer 28 and the surface layer 30 may be any material that realize the above function, and examples thereof include polycarbonate, polyester, polystyrene, polyimide, epoxy, polyisocyanate, polyamide, polyvinyl alcohol, polybutadiene, polymethyl methacrylate, copolymerized nylon, ultraviolet-curable acrylic resin, paraxylylene resin, silicone resin, and fluororesin.

In addition to the materials described above as the material forming the surface layer 28 and the surface layer 30, a material that contains a charge transporting substance may also be used. Examples of the charge transporting substance include hydrazone compounds, stilbene compounds, pyrazoline compounds, and arylamine compounds, which are hole transporting substances. Moreover, examples of the charge transporting substance as electron transporting substances include fluorenone compounds, diphenoquinone derivatives, pyran compounds, and zinc oxide. Furthermore, a self-supporting resin having a charge transporting property may be used.

The spacing member 24 may have a configuration that a material having enough strength for maintaining the gap between the display substrate 20 and the rear substrate 22. Examples of the material forming the spacing member 24 include photocurable resins and thermosetting resins.

Examples of the photocurable resins to be used for the spacing member 24 include polyvinyl cinnamate, photosensitive gelatin, a polyisoprene rubber or a nitrile-butadiene rubber containing a diazo compound or an azide compound, a novolac resin containing an azide compound, cellulose, polyamide, or modified polyvinyl alcohol in which a polyfunctional acrylate and a photopolymerization initiator are mixed, a diazo resin, an epoxy resin, an acrylic resin, a urethane acrylic resin, and a polyene-thiol resin.

Although the spacing member 24 may be either colored or colorless, the spacing member 24 is preferably colorless and transparent so as not to have a bad influence on an image to be displayed on the display medium 10, and in such a case, a transparent resin, such as an epoxy resin and an acrylic resin may be used as the spacing member 24.

The display medium 10 having the configuration as described above is used for bulletin boards, circular boards, electronic black boards, advertisement, signboards, flashing signs, electronic papers, electronic newspapers, and electronic books, in which images may be saved and rewritten, and document sheets which may be used with copying machines and printers.

Although the configuration in which the surface layer 28 is provided on the holding layer 26 has been explained according to the present exemplary embodiment, a configuration in which a surface layer 28 is not provided on the holding layer 26 may also be acceptable. The configuration in which the surface layer 28 is provided on the holding layer 26 is preferred because the adhesion of the particles 34 on a surface of a substrate is inhibited.

In FIG. 1 is illustrated, as one example, a case where the shape of the spacing member 24 is such a shape that the shape cross-sectioned in the facing direction of the substrates is a letter T shape and the first portion 24A in the spacing member 24 having a cross section with a letter T shape, is a portion which has a cross-sectional area in the intersecting direction larger than regions joined to the side of the rear substrate 22.

However, the shape of the spacing member 24 may be a shape in which one end of the spacing member 24 in the facing direction of the substrates has the first portion 24A projecting in the intersecting direction, and it is not restricted to such a shape having a cross section with a letter T shape.

For example, the shape of the spacing member 24 may be such a shape that the shape cross-sectioned in the facing direction of the substrates is a letter L shape (see FIG. 3A). In this case, a portion 24A$_1$ in the spacing member 24 having a cross section with a letter L shape, is a portion which has a cross-sectional area in the intersecting direction larger than regions joined to the side of the rear substrate 22 in the holding layer 26, corresponds to the first portion 24A.

Although a case where the shape of a cross section of the first portion 24A in the facing direction of the substrates is a rectangle is provided above, as the first portion 24A (see FIG. 1 and FIG. 3A), the first portion 24A is not restricted to a rectangle in sectional shape and also may be a portion in which the sectional shape of the first portion 24A in the facing direction of the substrates is a circular shape (see portion 24A$_2$ in FIG. 3B) as illustrated in FIG. 3B.

Although a case where the spacing member 24 has a cross section with a letter T shape in the facing direction of the substrates and includes a rectangular body portion 24B and the rectangular first portion 24A is illustrated as the spacing member 24 in FIG. 1, the sectional shape of the body portion 24B (a portion in the spacing member 24 other than the first portion 24A) in the facing direction of the substrates is not restricted to a rectangular shape. For example, the body portion 24B may be of a trapezoidal shape as shown in FIG. 4A (see body section 24B$_1$ in FIG. 4A).

Although a case where the first portion 24A is provided at the endmost part of the spacing member 24 in the facing direction of the substrates is illustrated in FIG. 1, the first portion 24A may be a portion projecting in the intersecting direction (the direction of arrow B in FIG. 1) and located in a region of the end part of the spacing member 24 of the side of the display substrate 20, the region being embedded in the holding layer 26, and it is not restricted to a configuration in which the first portion 24A is provided at the endmost part.

Specifically, the first portion 24A may be provided at a position that is apart by a predetermined distance from the end surface of the spacing member 24 on the side closer to the display substrate 20 toward the rear substrate 22 as shown in FIG. 4B.

Although a case where the spacing member 24 has one first portion 24A in the holding layer 26 is illustrated in FIG. 1, a configuration that two or more first portions 24A are provided in the holding layer 26 may also be acceptable (see FIG. 5). Specifically, a first portion 24A$_3$ and a first portion 24A$_4$ may be provided as the first portions 24A projecting in the intersecting direction (the direction of arrow B in FIG. 1) in a region of the end part of the spacing member 24 on the side of the display substrate 20, the region being embedded in the holding layer 26, as illustrated in FIG. 5A and FIG. 5B.

In such a case where the spacing member 24 has two or more first portions 24A in the holding layer 26, it is preferred that the first portion 24A having the largest cross-sectional area in the intersecting direction among the two or more first portions 24A (the first portion 24A$_4$ in FIG. 5A) is provided at the position closest to the display substrate 20, from the viewpoint of maintaining the end part of the spacing member 24 firmly on the side of the display substrate 20.

The spacing member 24 may have a configuration that two or more spherical members 25 are provided on the outer circumferential surface of a cylindrical or prismatic member 31 so that the two or more spherical members 25 project on the surface, as illustrated in FIG. 6A. In this case, each of the portions projecting in the intersecting direction (the portions 24A$_5$ in FIG. 6) in the region of the end part of the spacing member 24 on the side of the display substrate 20, the region being embedded in the holding layer 26 (the region P in FIG. 6A), corresponds to the first portion 24A. The region of the spacing member 24 exposed out of the holding layer 26 and the surface layer 28 serves as the body portion 24B.

The spacing member 24 may have such a shape that the cross-sectional area in the intersecting direction becomes larger continuously or gradually as getting closer to the display substrate 20 (for example, a conical shape and a pyramidal shape) (see FIG. 6B). In this case, a portion 24A$_4$ of the spacing member 24 within the region Q embedded in the holding layer 26 (FIG. 6B) corresponds to the first portion 24A (see portion 24A$_4$ in the region Q, in FIG. 6B). The region of the spacing member 24 exposed out of the holding layer 26 and the surface layer 28 serves as the body portion 24B (see section 24B$_2$ in FIG. 6B).

Although a case where the first portion 24A is provided only at the end part (one end part) of the spacing member 24 on the side of the display substrate 20 only in the facing direction of the substrates is explained according to the present exemplary embodiment, a configuration in which the first portion 24A is provided only at an end part on a side of the rear substrate 22 may also be acceptable. In this case, it is preferable that the holding layer 26 and the surface layer 30 are formed in this order on the surface of the rear substrate 22 facing the display substrate 20.

Although a case where the first portion 24A is provided only at the end part of the spacing member 24 located on the side of one substrate (the side of the display substrate 20 in FIG. 1) in the facing direction of the substrates is illustrated as one example according to the present exemplary embodiment, a configuration in which the first portions 24A are provided at the end part of the side of both the substrates, i.e., the display substrate 20 and the rear substrate 22 (that is, both end parts) as illustrated in FIG. 7 may also be acceptable.

In this case, it is preferable that both the holding layer 26 and the surface layer 30 are provided on the display substrate 20 and on the rear substrate 22 in this order on the surfaces of the substrates that face each other.

Figure 8:
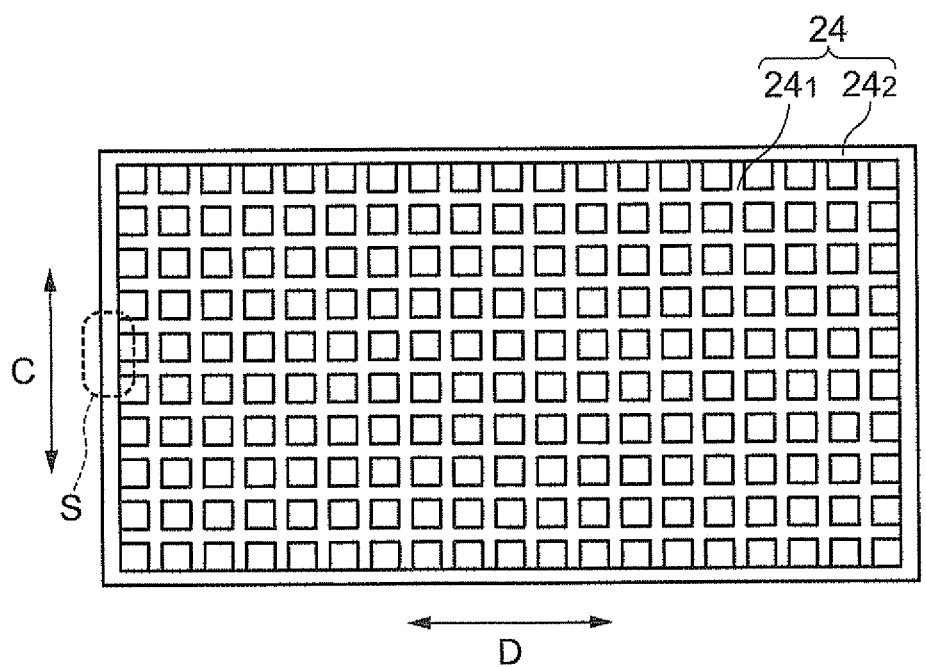
FIG. 8 is a schematic constitutional diagram schematically illustrating a state of the spacing member of the display medium according to the present exemplary embodiment viewed from a display substrate side.

FIG. 8 is a schematic constitutional diagram schematically illustrating a state of the spacing member of the display medium according to the present exemplary embodiment viewed from a display substrate side. When spacing members 24 are provided so that the region between the substrates, i.e., the display substrate 20 and the rear substrate 22 in the display medium 10 is divided into two or more regions (cells), there is provided a state where the region between the substrates, i.e., the display substrate 20 and the rear substrate 22, are divided into two or more cells by spacing members 24$_1$ as the spacing members 24 as shown in FIG. 8 when the display medium 10 is viewed from the side of the display substrate 20. It is thought that the strength of the display medium 10 is increased by further providing, in a region along the four sides of the display substrate 20 and the rear substrate 22 between the substrates, i.e., the display substrate 20 and the rear substrate 22, band-shaped spacing members 24$_2$ extending along the extending directions of the four sides of these substrates (the direction of arrow C and the direction of arrow D in FIG. 8) as the spacing members 24. The spacing members 24$_1$ and spacing members 24$_2$ correspond to the above spacing members 24. As to portion S, see FIG. 11 described below.

Figure 9:
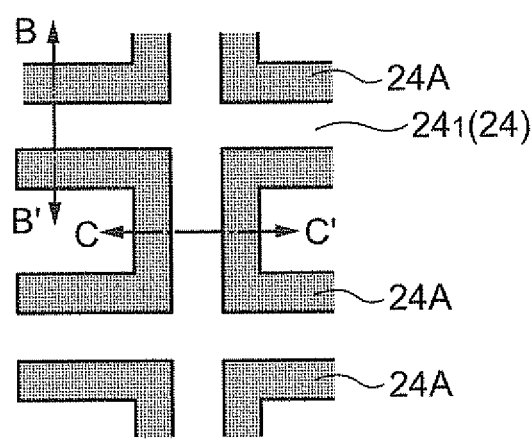
FIG. 9 is an enlarged diagram schematically illustrating a state of the spacing member of the display medium according to the present exemplary embodiment viewed from a display substrate side.

FIG. 9 is an enlarged diagram schematically illustrating a state of the spacing member of the display medium according to the present exemplary embodiment viewed from a display substrate side. The first portion 24A projecting in the intersecting direction that intersects the facing direction of the substrates may be in a state in which the first portion 24A is provided in a band shape along the extending direction of each of the spacing members 24 (the spacing member 24$_1$ and the spacing member 24$_2$) along the surface of the display substrate 20 (see FIG. 9) when the display medium 10 is viewed from the side of the display substrate 20.

When the first portion 24A is in a state in which the first portion 24A is provided in a band shape along the extending direction of each of the spacing members 24 along the surface of the display substrate 20 as illustrated in FIG. 9 when the display medium 10 is viewed from the side of the display substrate 20, the pattern diagrams of the B-B' section and the C-C' section in FIG. 9 each correspond to, for example, the pattern diagram depicted in FIG. 1.

Figure 10A:
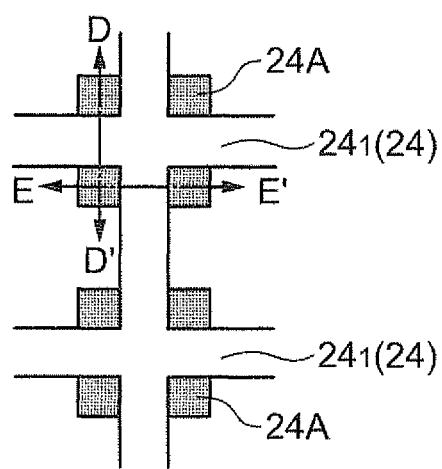
FIGS. 10A and 10B are enlarged diagrams schematically illustrating a state of the spacing member of the display medium according to the present exemplary embodiment viewed from a display substrate side.
Figure 10B:
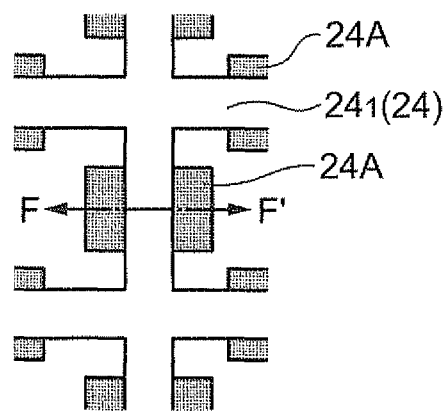

FIGS. 10A and 10B are enlarged diagrams schematically illustrating a state of the spacing member of the display medium according to the present exemplary embodiment viewed from a display substrate side. The first portion 24A may be provided only in a region where spacing members 24 intersect each other in the extending direction of each spacing member 24 along the surface of the display substrate 20 when the display medium 10 is viewed from the side of the display substrate 20 (see FIG. 10A). The first portion 24A may be provided only in a region other than the region where spacing members 24 intersect each other in the extending direction of each spacing member 24 along the surface of the display substrate 20 when the display medium 10 is viewed from the side of the display substrate 20 (see FIG. 10B).

When the first portion 24A is provided only in a region where spacing members 24 intersect each other in the extending direction of each spacing member 24 along the surface of the display substrate 20 when the display medium 10 is viewed from the side of the display substrate 20 as illustrated in FIG. 10A, the pattern diagrams of the D-D' section and the E-E' section in FIG. 10A each correspond to, for example, the pattern diagram shown in FIG. 1.

When the first portion 24A is provided only in a region other than the region where spacing members 24 intersect each other in the extending direction of each spacing member 24 along the surface of the display substrate 20 when the display medium 10 is viewed from the side of the display substrate 20 as illustrated in FIG. 10B, the pattern diagram of the F-F' section in FIG. 10B corresponds to, for example, the pattern diagram shown in FIG. 1.

Figure 11:
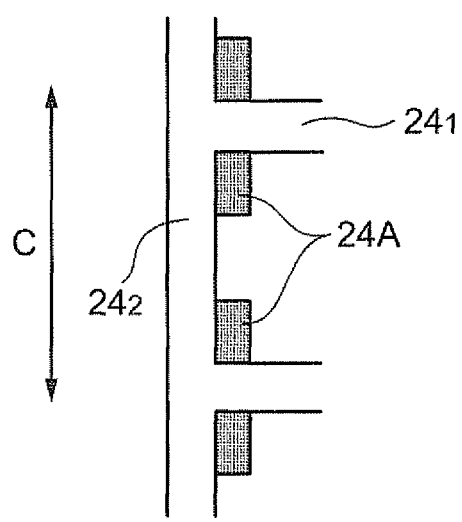
FIG. 11 is an enlarged diagram schematically illustrating a state of the spacing member of the display medium according to the present exemplary embodiment viewed from a display substrate side.

FIG. 11 is an enlarged diagram schematically illustrating a state of the spacing member of the display medium according to the present exemplary embodiment viewed from a display substrate side. When in a region between the substrates, i.e., the display substrate 20 and the rear substrate 22, the region being along the four sides of the display substrate 20 and the rear substrate 22, a spacing member 24$_2$ extending in a band shape along the extending direction of each of the four sides of the substrates is provided as the spacing member 24 (see the portion S in FIG. 8), As to the first portion 24 in the spacing member 24$_2$, it is preferred that the shape thereof viewed from the side of the display substrate 20 or the side of the rear substrate 22 be a shape that is longer in the extending direction of a side parallel to the spacing member 24$_2$ (the direction of arrow C) (see FIG. 11).

Next, an example of the method of producing the display medium 10 according to the present exemplary embodiment is explained.

The display medium 10 according to the present exemplary embodiment is produced via
(1) forming a spacing member 24 on a rear substrate 22,
(2) forming, on a display substrate 20, a coating layer containing a stimulus-curable material,
(3) embedding, into the coating layer, a first portion 24A provided at an end part of the spacing member 24 formed on the above rear substrate 22, (4) applying a stimulus to the coating layer to cure.

(1) Forming a Spacing Member 24 on a Rear Substrate 22

As the method of forming the spacing ember 24 on the rear substrate 22, an imprinting method, an etching method, a resist method, a resin coating method, and the like are used.

Specifically, when the spacing member 24 cross-sectioned in the facing direction of the substrates having a letter T shape or a letter L shape shown in FIG. 1 or FIG. 3A is formed on the rear substrate 22, an imprinting method or a dry resist method is used, for example. FIGS. 12A through 12D are pattern diagrams illustrating a process of manufacturing the display medium according to the present exemplary embodiment.

Figure 12A:
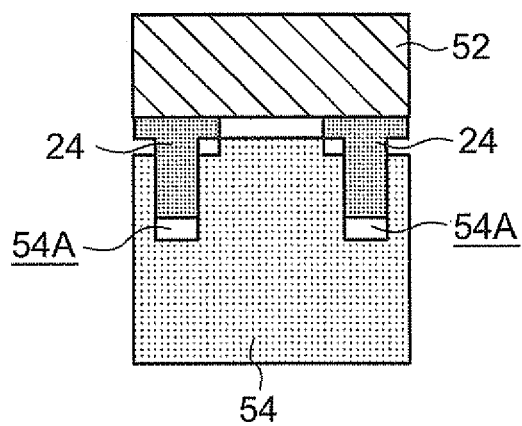
FIGS. 12A through 12D are pattern diagrams illustrating a process of manufacturing the display medium according to the present exemplary embodiment.

Particularly, in order to form, on the rear substrate 22, a spacing member 24 having a letter T-shaped cross section in the facing direction of the substrates shown in FIG. 1, by an imprinting method, for example, a material to form the spacing member 24 (for example, a stimulus-curable resin) is filled into an recessed portion 54A of a mold 54 having the recessed portion 54A with a shape corresponding to the shape of the spacing member 24 having a letter T-shaped cross section, and then an opening of the recessed portion 54A is sealed with a substrate 52, as illustrated in FIG. 12A. Then, to the stimulus-curable resin filled in the recessed portion 54A is applied a stimulus for curing the resin.

Figure 12B:
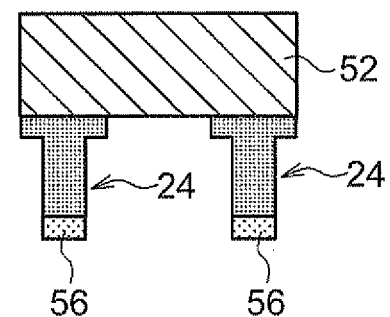
Figure 12B:
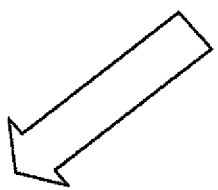
Figure 12C:
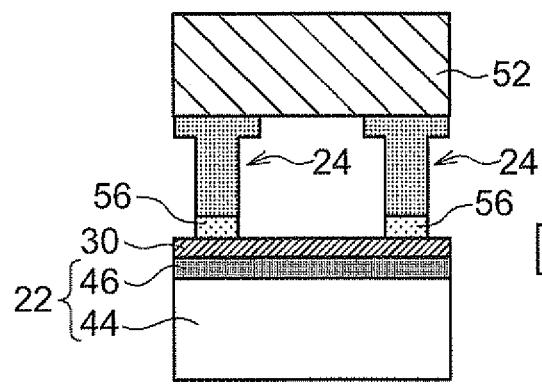
Figure 12D:
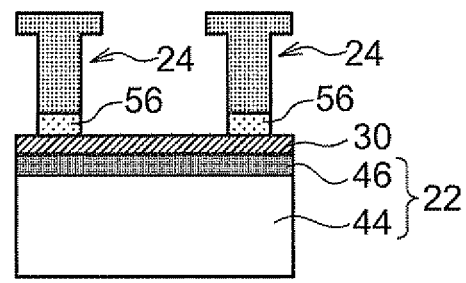

Then, the spacing member 24 that is formed by the curing of the stimulus-curable resin and that has a cross section with a letter T shape is taken out together with the substrate 52 from the mold 54 (see FIG. 12B).

Next, an adhesive is applied to an end surface of the spacing member 24 in which a sectional shape thereof in the facing direction of the substrates is a letter T shape, the end surface being located on a side opposite to the side where the first portion 24A is formed, whereby an adhesive layer 56 is formed. Separately, a surface layer 30 is provided on the surface of the rear substrate 22 located on the side of the electrode 46, and these members are superposed and adhered so that the surface layer 30 and the adhesive layer 56 may face to come in contact with each other (see FIG. 12C). Then, the substrate 52 is detached from the spacing member 24, so that a member in which the spacing member 24 is formed on the rear substrate 22 is formed (see FIG. 12D).

On the rear substrate 22, a spacing member 24 in which cross section thereof in the facing direction of the substrates is a letter T shape is formed as shown in FIG. 1.

Figure 13A:
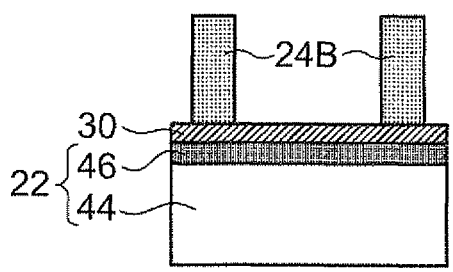
FIGS. 13A through 13C are pattern diagrams illustrating a process of manufacturing the display medium according to the present exemplary embodiment.
Figure 13B:
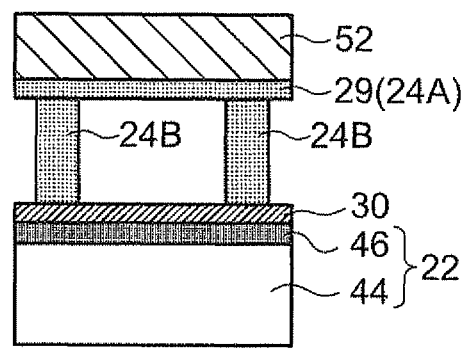
Figure 13C:
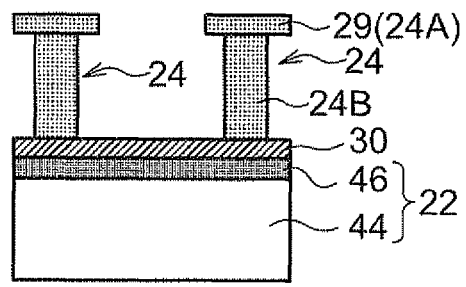

FIGS. 13A through 13C are pattern diagrams illustrating a process of manufacturing the display medium according to the present exemplary embodiment. In order to form a spacing member 24 in which cross section thereof in the facing direction of the substrates is a letter T shape as shown in FIG. 1 on the rear substrate 22 by using a dry resist method, for example, a surface layer 30 is provided on a surface of the rear substrate 22 on the side of the electrode 46 as illustrated in FIG. 13A, and then a body portion 24B of the spacing member 24 is formed on the surface layer 30 by a photolithographic method. In the photolithographic method referred to herein, a coating liquid containing the material forming the spacing member 24 (for example, a stimulus-curable resin) is applied onto the surface layer 30 formed on the rear substrate 22 by using a spin coater, a roll coater or the like and dried to form a coating film, and then the body portion 24B having, for example, a prismatic form is formed by pattern exposing, developing, and baking the coating film.

Next, a first portion 24A (a dry resist film 29) is formed on a tip portion of the body section 24B by, for example, a dry resist method. Specifically, there is used a method in which the dry resist film 29 superposed on the substrate 52 is superposed on the tip portion of the body section 24B so that the dry resist film 29 contacts with the body portion 24B as illustrated in FIG. 13B, the dry resist film 29 and the body portion 24B bonded by thermocompression using a hot laminator or the like (not shown), then a mask pattern (not shown) is superposed on the substrate 52 which is superposed on the dry resist film 29, subsequently light is applied to detach the substrate 52 of the dry resist film 29, and then development is performed using a developing solution (see FIG. 13C).

On the rear substrate 22, the spacing member 24 in which the cross section thereof in the facing direction of the substrates is a letter T shape is formed as shown in FIG. 1 and FIG. 13C.

Figure 14A:
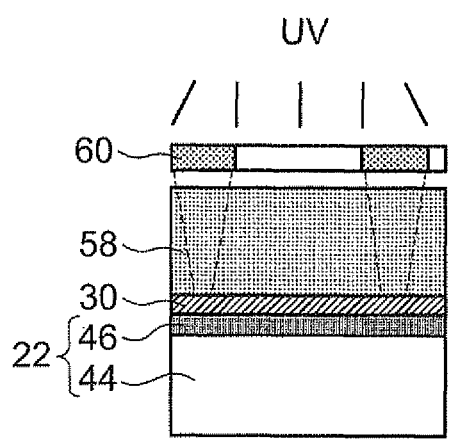
FIGS. 14A and 14B are pattern diagrams illustrating a process of manufacturing the display medium according to the present exemplary embodiment.
Figure 14B:
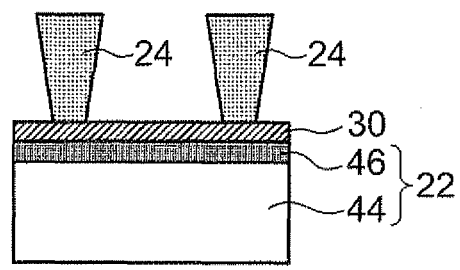

When a conical spacing member 24 that becomes larger continuously or gradually in cross-sectional area of the intersecting direction as getting closer to the display substrate 20 is formed on the rear substrate 22 as shown, for example, in FIG. 6B, a resist method is used, for example. FIGS. 14A and 14B are pattern diagrams illustrating a process of manufacturing the display medium according to the present exemplary embodiment.

Particularly, for example, a surface layer 30 is disposed on the rear substrate 22, and then a photoresist (for example, a positive type photoresist) is applied to the surface layer 30 as shown in FIG. 14A to form a coating layer 58. Then, a photomask 60 that shields only the region corresponding to a spacing member 24 is superposed on the coating layer 58, subsequently the resultant is exposed to light, and then developed with an alkali solution so that the exposed portion is removed. As a result, the conical spacing member 24 that becomes larger continuously or gradually in cross-sectional area of the intersecting direction as getting closer to the display substrate 20 is formed on the rear substrate 22 as shown, for example, in FIG. 6B (see FIG. 14B).

Figure 15A:
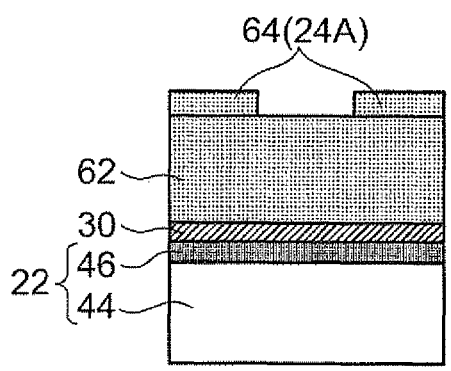
FIGS. 15A and 15B are pattern diagrams illustrating a process of manufacturing the display medium according to the present exemplary embodiment.
Figure 15B:
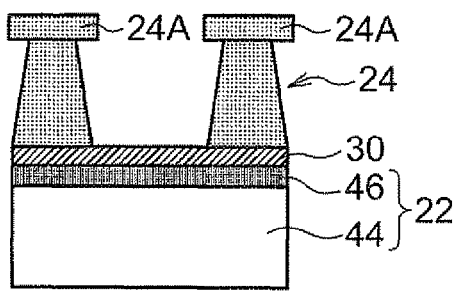

For example, in a case of forming, on the rear substrate 22, a spacing member 24 having such a shape that the sectional shape of the body section 24B is a trapezoid and a first portion 24A is provided at the end part thereof on the side of the display substrate 20 as shown in FIG. 4A, an etching method is used, for example. FIGS. 15A and 15B are pattern diagrams illustrating a process of manufacturing the display medium according to the present exemplary embodiment.

Particularly, for example, firstly a surface layer 30 is formed on the rear substrate, then a coating liquid containing a material forming the spacing member 24 (e.g., a stimulus-curable resin) is applied onto the surface layer 30 by using a spin coater, a roll coater or the like as illustrated in FIG. 15A and dried to form a coating film 62, and then a member 64 that prevents etching by etching treatment to be performed subsequently and that is to become a first portion 24A is provided on the coating film 62.

Next, by performing etching treatment using an etching liquid, regions other than the region where the member 64 that prevents etching is provided are etched in the thickness direction of the rear substrate 22. A spacing member 24 having such a shape that the sectional shape of the body section 24B is a trapezoid and a first portion 24A is provided at the end part thereof on the side of the display substrate 20 is formed on the rear substrate 22 as shown in FIG. 15B and FIG. 4.

For example, in the case of forming, on the rear substrate 22, a spacing member 24 having a configuration as shown in FIG. 6A in which two or more spherical members 25 are provided on the outer circumferential surface of a cylindrical or prismatic member 31 so that the two or more spherical members 25 project from the surface, a dry resist method is used, for example. FIGS. 16A and 16B are pattern diagrams illustrating a process of manufacturing the display medium according to the present exemplary embodiment.

In the case of forming, on the rear substrate 22 using a dry resist method, a spacing member 24 having such a configuration as shown in FIG. 6A that two or more spherical members 25 are provided on the outer circumferential surface of a cylindrical or prismatic member 31 so that two or more spherical members 25 project from the surface, for example, a surface layer 30 is provided first on the surface of the rear substrate 22 on the side of the electrode 46 as illustrated in FIG. 16A, and then a coating liquid in which a filler 25A corresponding to the spherical members 25 are dispersed in the material forming the spacing member 24 (for example, a stimulus-curable resin) is applied to the surface layer 30 by using a spin coater, a roll coater or the like and dried to form a coating film 66. Then, the coating film 66 is subjected to pattern exposure, development, and baking, so that a spacing member 24 having such a configuration that two or more spherical members 25 are provided on the outer circumferential surface of a cylindrical or prismatic member 31 so that the two or more spherical members 25 project from the surface is formed on the rear substrate 22 (see FIG. 16B).

For example, in the case of forming, on the rear substrate 22, a spacing member 24 as shown in FIG. 3B that has a first portion 24A with a cross section in the facing direction of the substrates having a spherical shape at an end of the cylindrical or prismatic body portion 24B located on the side of the display substrate 20, a resin application method is used, for example. FIGS. 17A and 17B are pattern diagrams illustrating a process of manufacturing the display medium according to the present exemplary embodiment.

Particularly, for example, a surface layer 30 is formed on the rear substrate 22 first, and then a cylindrical or prismatic body portion 24B is formed by the above-described photolithographic method or the like on the surface layer 30 (see FIG. 17A).

Next, a first portion 24A is formed by applying a resin to the tip portion of the body portion 24B on the side of the display substrate 20 (see FIG. 17B). As a result, a spacing member 24 as shown in FIG. 3B that has a first portion 24A with a cross section in the facing direction of the substrates having a spherical shape at the end part of the cylindrical or prismatic body portion 24B located on the side of the display substrate 20 is formed on the rear substrate 22 (FIG. 17B).

FIGS. 18A through 18E are pattern diagrams illustrating a process of manufacturing the display medium according to the present exemplary embodiment.

Figure 18A:
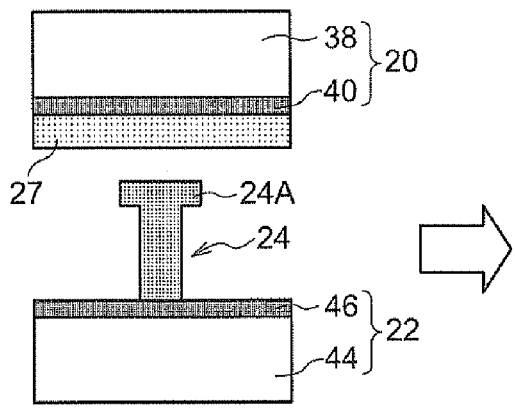
FIGS. 18A through 18E are pattern diagrams illustrating a process of manufacturing the display medium according to the present exemplary embodiment.
Figure 18B:
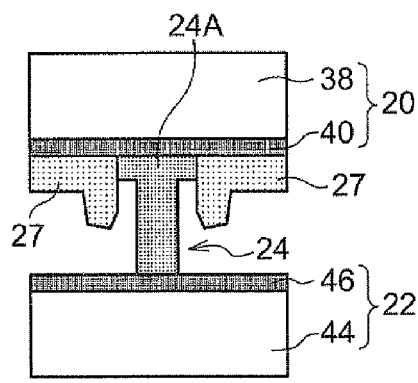

(2) Forming, on a Display Substrate 20, a Coating Layer Containing a Stimulus-Curable Material, Subsequently, a coating layer 27 containing a stimulus-curable material is formed on the display substrate 20 as illustrated in FIG. 18A. The coating layer 27 may be formed by using a spin coater, a roll coater or the like.

(3) Embedding, into the Coating Layer, a First Portion 24a Provided at an End Part of the Spacing Member 24 Formed on the Above Rear Substrate 22, Next, the first portion 24A of the spacing member 24 formed on the rear substrate 22 in the above step (1) is embedded in the coating layer 27 formed in the above step (2) (FIG. 18 B). When the coating layer 27 has a certain degree of flowability, it flows to the circumference of the first portion 24A spontaneously, so that the first portion 24A is embedded.

Figure 18C:
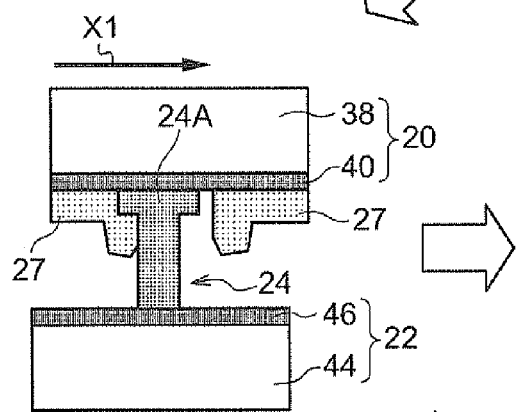
Figure 18D:
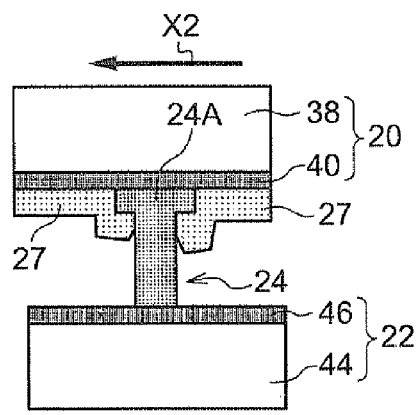
Figure 18E:
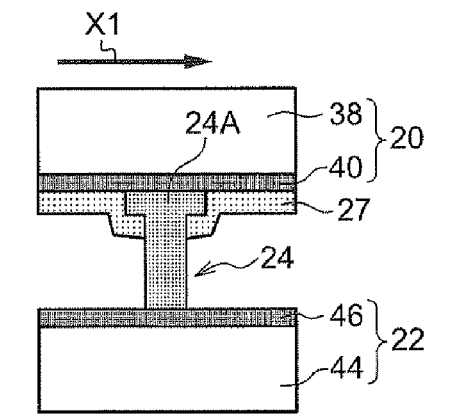

Alternatively, in order to embed more certainly, while the first portion 24A of the spacing member 24 is kept embedded in the coating layer 27, the spacing member 24 and the display substrate 20 are relatively moved in a specific direction along the surface of the display substrate 20 (the direction of arrow X1 in FIG. 18C), and then they are moved in the reverse direction (the direction of arrow X2 in FIG. 18D), so that they are moved back and forth each other (see FIG. 18C through FIG. 18E).

The first portion 24A of the spacing member 24 is embedded into the coating layer 27, resulting in a state where the material forming the coating layer 27 is filled into a gap between a surface of the display substrate 20 which faces the rear substrate 22 and an end surface of the spacing member 24 which faces the display substrate 20, and the coating layer 27 is provided so as to continuously cover the first portion 24A from an end surface of the spacing member 24 which faces the display substrate 20.

(4) Applying a Stimulus to the Coating Layer to Cure.

Next, to the coating layer 27 in which the first portion 24A of the spacing member 24 is embedded, a stimulus for curing the stimulus-curable material contained in the coating layer 27 is added, so that the coating layer 27 is cured to form a holding layer 26.

Then, a dispersing medium 50 in which particles 34 are dispersed is filled into each of the cells divided by the spacing member 24 between the substrates, i.e., the display substrate 20 and the rear substrate 22, so that the display medium 10 according to the present exemplary embodiment is produced.

In the display medium 10 explained above, by changing the value of the voltage applied to the display substrate 20 and the rear substrate 22, the particles 34 filling each cell move between the substrates so as to produce displays.

Although a case where the display medium 10 is a display medium 10 of electrophoresis type in which particles 34 is filled into each cell has been explained according to the present exemplary embodiment, the display medium 10 is not restricted to such a configuration and is not restricted to the electrophoresis type and, for example, a liquid crystal display medium in which a liquid crystal layer is provided in each cell may also be acceptable.

Figure 19:
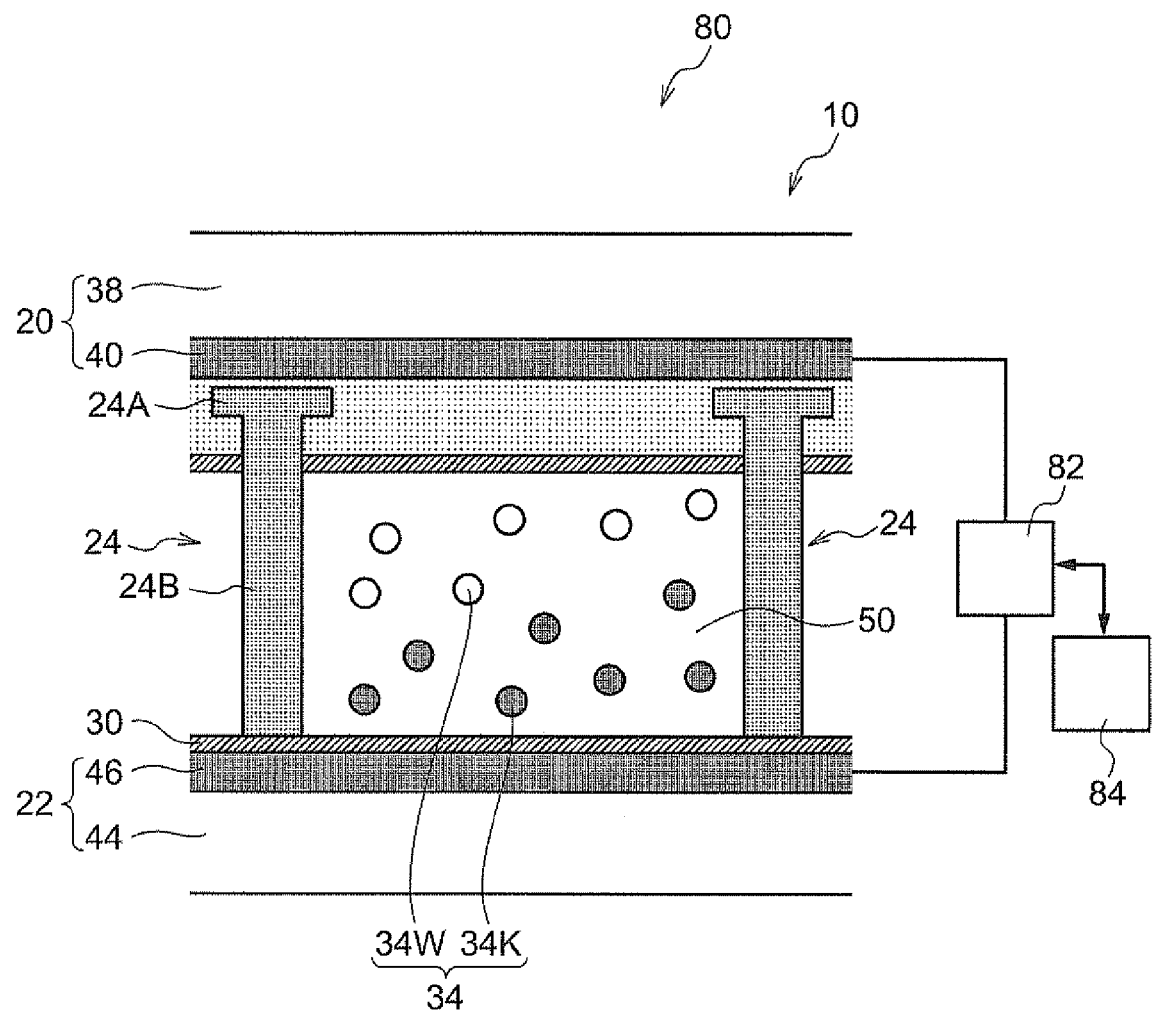
FIG. 19 is a pattern diagram illustrating an example of the display device according to the present exemplary embodiment.

Next, an example of a display device which displays images on the display medium 10 according to the present exemplary embodiment is explained. FIG. 19 is a pattern diagram illustrating an example of the display device according to the present exemplary embodiment.

For example, a display device 80 according to the present exemplary embodiment includes the above-described display medium 10, a voltage applying unit 82, and a controlling unit 84 as illustrated in FIG. 19.

The voltage applying unit 82 is connected electrically to an electrode 40 and an electrode 46. Although a case where both the electrode 40 and the electrode 46 are connected electrically to the voltage applying unit 82 is explained according to the present exemplary embodiment, a configuration that one of the electrode 40 and the electrode 46 is grounded and the other is connected to the voltage applying unit 82 may also be acceptable.

The voltage applying unit 82 is connected to the controlling unit 84 so that signals may be transferred in or out.

The controlling unit 84 includes a CPU (Central Processing Unit) that manages the operation of the whole device, a RAM (Random Access Memory) that memorizes various data temporarily, a ROM (Read Only Memory) in which various programs, such as a control program that controls the whole device, is memorized in advance, and a bus that connects these.

The voltage applying unit 82 is a voltage applying device for applying a voltage to the electrode 40 and the electrode 46 and applies, to the electrode 40 and the electrode 46, a voltage depending on the control of the controlling unit 84.

The display medium 10 is mounted in the display device 80 and a voltage that makes particles 34 move toward the display substrate 20 or the rear substrate 22 is applied to the electrode 40 and the electrode 46 by the control of the controlling unit

84, so that the particles 34 move toward the display substrate 20 or the rear substrate 22 selectively. As a result, images depending on the applied voltage are formed on the display medium 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium comprising:
    a pair of substrates;
    a spacing member that maintains a gap between the pair of substrates and has a first portion projecting in an intersecting direction, the intersecting direction intersecting a direction in which the pair of substrates face each other,
        the first portion having a cross-section in the intersecting direction being wider than a cross-section of a region of the spacing member adjoining the first portion; and
    a holding layer that is provided on at least one of the pair of substrates such that
        the holding layer fills a space between the at least one of the pair of substrates and an end face of the spacing member,
        the holding layer covers the first portion from the end face of the spacing member, and
        the holding layer holds an end part of the spacing member in the direction in which the pair of substrates face each other.

2. The display medium according to claim 1, wherein the holding layer has electrical conductivity.

3. The display medium according to claim 1, further comprising a liquid disposed between the pair of substrates.

4. A method of producing the display medium according to claim 1, the method comprising:
    forming, on a substrate, a coating layer containing a stimulus-curable material that is cured by application of a stimulus;
    embedding the first portion of the spacing member into the coating layer; and
    applying a stimulus to the coating layer.

5. A display device comprising:
    the display medium according to claim 1, and
    a voltage application unit that applies a voltage between the pair of substrates of the display medium.

6. A display medium comprising:
    a pair of substrates;
    a spacing member that maintains a gap between the pair of substrates, and that, within an entire region spanning from one end to the other end in a direction in which the pair of substrates face each other, and has a first portion that has a cross-sectional area perpendicular to the direction in which the pair of substrates face each other that is larger than that of another portion joined to one of the pair of substrates,
        the first portion having a cross-section in the direction in which the pair of substrates face each other being wider than a cross-section of a region of the spacing member adjoining the first portion; and
    a holding layer that is provided on at least one of the pair of substrates such that
        the holding layer fills a space between the at least one of the pair of substrates and an end face of the spacing member,
        the holding layer covers the first portion from the end face of the spacing member, and
        the holding layer holds an end part of the spacing member in the direction in which the pair of substrates face each other.

7. The display medium according to claim 6, wherein the holding layer has electrical conductivity.

8. The display medium according to claim 6, further comprising a liquid disposed between the pair of substrates.

9. A method of producing the display medium according to claim 6, the method comprising:
    forming, on a substrate, a coating layer containing a stimulus-curable material that is cured by application of a stimulus;
    embedding the first portion of the spacing member into the coating layer; and
    applying a stimulus to the coating layer.

10. A display device comprising:
    the display medium according to claim 6, and
    a voltage application unit that applies a voltage between the pair of substrates of the display medium.

* * * * *